United States Patent Office 2,989,404
Patented June 20, 1961

2,989,404
PROCESS OF DEHYDRATING CREAMED CORN
Alvin I. Nelson, Champaign, Ill., assignor to the United States of America as represented by the Secretary of the Army
No Drawing. Filed Mar. 2, 1960, Ser. No. 12,487
2 Claims. (Cl. 99—204)

This invention relates to dehydrated foods and the method of preparing the same, and especially to a precooked dehydrated cream-style sweet corn.

So far as the applicant is aware, it has not been possible heretofore to dehydrate sweet corn in such a way that when reconstituted it will be acceptable in all respects and be the equal of conventional sweet corn with respect to color, flavor, consistency, and texture.

A primary object of the invention, therefore, consists in providing a method of preparing a precooked dehydrated food, such as cream-style sweet corn, which can be almost instantly rehydrated and yet be wholly acceptable in color, flavor, consistency and texture.

Other objects and advantages of the invention will be apparent from the following description which is concerned especially with sweet corn but which may be adapted to other corn grains.

The invention consists essentially in segregating two components of the grain, namely, a cream component and a kernel component, and thereafter dehydrating them, and then combining the two dehydrated products. When sweet corn was the raw material being treated, the cream component was prepared by several different but analogous methods. In one method, the corn on the cob was first passed through a corn cutter with the knives set for a shallow cut so that only the top third of the kernels were removed. Then scraper blades were installed in the cutter and the cobs were again passed through the unit to obtain the remaining endosperm. This product was cooked and then comminuted or finished before dehydration.

In another and preferred method, the cream component was prepared from mature deep-cut sweet corn kernels that were steam-blanched for 7½ minutes, comminuted in a Fitzmill with the cutting blades running at approximately 5200 r.p.m. and a No. 5 screen, and finished through an 0.045″ screen. When the grain was immature, waxy pregelatinized starch, 3% by weight, was added to the cream to alleviate stickiness, and the cream was then dehydrated on a double-drum dryer operated under atmospheric conditions with a roll steam pressure of 35 p.s.i.g., roll spacing of 0.0015″, and roll retention time of about 14 seconds. The final moisture content of the dry product was less than 5%.

In this preferred method, the kernel component was likewise prepared from mature, deep-cut kernels that were blanched and comminuted. This material was spooned onto a stainless tray in cookie-like gobs and frozen. The trays were placed in a freeze-dryer with the temperature of dehydration at about 75° F. for the first 4 hours and then at 130° F. for an additional 4 hours. The dry gobs having a moisture content of less than 5%, were then crumbled, and the particles passing through a 12/64″ screen but retained on a 1/12″ screen were selected to serve as the simulated kernal component.

The precooked dehydrated cream-style sweet corn consists of a mixture of the cream component and the kernel component to which sugar and salt are added and the proportions of cream component and simulated kernel component may vary between wide limits. For instance, the cream component may vary between 80% and 20% of the dehydrated mixture exclusive of the sugar and salt and the simulated kernel component may vary between 20% and 80%. One acceptable formula may be proportioned about as follows:

|   | Percent by weight |
|---|---|
| Drum-dried cream component | 68.5 |
| Simulated corn kernel component | 23.3 |
| Waxy maize starch | 1.2 |
| Sugar | 4.9 |
| Salt | 2.1 |

This formula was rehydrated by adding about 75 cc. of boiling water to 25 grams of the dehydrated product, stirred thoroughly, and allowed to stand for 5 to 10 minutes before serving. The resulting product was found to be quite acceptable in all respects and to be the equal in color, flavor, consistency and texture to conventional creamed sweet corn. The keeping qualities of the dehydrated product may be extended by the addition of sulfur dioxide.

In accordance with the patent statutes, I have described what I consider to be the preferred method of producing dehydrated creamed corn and especially a precooked dehydrated cream-style sweet corn, and the product derived therefrom, but inasmuch as various minor changes may be made in the steps of the method without departing from the spirit of the invention, it is intended that all such changes be included within the scope of the appended claims.

I claim:

1. The method of dehydrating corn which may be instantly rehydrated by the addition of hot water and give excellent results as to color, flavor, consistency and texture, which comprises extracting a cream component from corn kernels, cooking and then dehydrating the cream component, providing a kernel component from the corn by blanching and comminuting the kernels, dehydrating the comminuted kernels and then mixing the dehydrated comminuted kernels with the dehydrated cream component, whereby a readily rehydratable dehydrated product is obtained which upon rehydration has a texture and flavor substantially corresponding to the texture and flavor of a fresh creamed corn dish.

2. The method of dehydrating sweet corn which may be instantly rehydrated by the addition of hot water and give excellent results as to color, flavor, consistency and texture, which comprises extracting a cream component from sweet corn kernels, cooking and then dehydrating the cream component, providing a kernel component from sweet corn by blanching and comminuting the kernels and freeze-drying the comminuted kernel component, crumbling the dehydrated kernel component and mixing it with the dehydrated cream component, and adding minor amounts of sugar and salt, whereby a readily rehydratable dehydrated product is obtained which upon rehydration has a texture and flavor substantially corresponding to the texture and flavor of a fresh creamed corn dish.

References Cited in the file of this patent

UNITED STATES PATENTS

| 1,399,471 | Faitelowitz | Dec. 6, 1921 |
| 2,484,376 | Cover | Oct. 11, 1949 |
| 2,540,745 | Link | Feb. 6, 1951 |